US011354868B1

(12) United States Patent
Judd et al.

(10) Patent No.: US 11,354,868 B1
(45) Date of Patent: Jun. 7, 2022

(54) METHOD TO MAP DYNAMICALLY DRAWN AUGMENTED REALITY (AR) SCRIBBLES USING RECOGNITION OF DISCRETE SPATIAL ANCHOR(S)

(71) Applicant: ZEBRA TECHNOLOGIES CORPORATION, Lincolnshire, IL (US)

(72) Inventors: Thomas William Judd, Barrington, IL (US); Kevin B. Mayginnes, Schaumburg, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/187,210

(22) Filed: Feb. 26, 2021

(51) Int. Cl.
*G06T 19/00* (2011.01)
*G06T 7/70* (2017.01)
*G06V 30/228* (2022.01)

(52) U.S. Cl.
CPC ............. *G06T 19/006* (2013.01); *G06T 7/70* (2017.01); *G06V 30/228* (2022.01); *G06T 2207/30204* (2013.01)

(58) Field of Classification Search
CPC .................... G06T 19/006; G06T 7/70; G06T 2207/30204
See application file for complete search history.

(56) References Cited

U.S. PATENT DOCUMENTS

| 2015/0302649 | A1* | 10/2015 | Komatsu | G06K 9/00671 345/633 |
| 2016/0055676 | A1* | 2/2016 | Kasahara | G06T 19/006 345/633 |
| 2016/0292925 | A1* | 10/2016 | Montgomerie | G09B 5/06 |
| 2017/0083276 | A1* | 3/2017 | Lee | G06F 1/1684 |
| 2018/0218538 | A1* | 8/2018 | Short | G02B 27/017 |
| 2018/0322702 | A1* | 11/2018 | Djajadiningrat | G06T 19/006 |
| 2019/0158547 | A1* | 5/2019 | Fink | G06T 19/006 |

\* cited by examiner

*Primary Examiner* — Jeffery A Brier

(57) ABSTRACT

Systems and methods for producing remote assistance via augmented reality (AR) by utilizing a field service device and a remote expert device are disclosed herein. An example method includes a field service device generating a non-AR video feed, and sending the non-AR video feed to a remote expert device. A user of the remote expert device then annotates the non-AR video feed by drawing a scribble pattern onto the non-AR video feed. The remote expert device then sends the scribble pattern to the field service device as an array of coordinates. The field service device then maps the received scribble pattern to a plane to create an AR scribble pattern. The field service device then creates an AR video feed based on the AR scribble pattern.

16 Claims, 9 Drawing Sheets

METHOD TO MAP DYNAMICALLY DRAWN AUGMENTED REALITY (AR) SCRIBBLES USING RECOGNITION OF DISCRETE SPATIAL ANCHOR(S)

BACKGROUND

In some work environments, a field worker is in communication with a remote expert. For example, a field worker may be at a work site repairing an electrical circuit; and a remote expert (e.g., offsite in an office building) will remotely explain to the field worker how to repair the electrical circuit. However, current systems for communication between the field worker and remote expert are often inefficient and cumbersome. There is thus a need for improved systems that more effectively and efficiently facilitate communication between the field worker and the remote expert.

SUMMARY

In an embodiment, the present invention is a method for producing remote assistance via augmented reality (AR) by utilizing a field service device. The method includes sending, via a processor of the field service device, a continuous non-AR video feed generated by a camera of the field service device to a remote expert device. The method further includes receiving, at the processor of the field service device and from the remote expert device, a first scribble pattern. The method also includes determining, at the processor of the field service device, a spatial anchor in the continuous non-AR video feed from a fiducial marker in the continuous non-AR video feed. The method further includes determining, at the processor of the field service device, a plane based on (i) the spatial anchor and (ii) the camera orientation relative to the spatial anchor. The method further includes mapping, at the processor of the field service device, the first scribble pattern to the plane to create an AR scribble pattern. The method further includes creating, at the processor of the field service device, a continuous AR video feed based on the AR scribble pattern and the spatial anchor. The method further includes sending the continuous AR video feed from the processor of the field service device to the remote expert device for display on the remote expert device.

In one variation of this embodiment, the method further includes displaying, on a display of the field service device, the AR video feed.

In one variation, the method further includes determining, from the spatial anchor: a location of an origin of a fixed three-dimensional (3D) coordinate system; an offset angle between: (i) a fixed x, y, z axis of the 3D coordinate system and (ii) the camera; and a distance from the camera to the origin of the 3D coordinate system.

In one variation, the computing of the plane is performed based on: the origin of the fixed 3D coordinate system; the offset angle; and the distance from the camera to the origin of the 3D coordinate system.

In one variation, the distance from the camera to the origin of the 3D coordinate system is calculated based on a size that the fiducial marker appears in a view of the continuous non-AR video feed.

In one variation, the first scribble pattern comprises an array of coordinates.

In one variation, the spatial anchor is a first spatial anchor, and the fiducial marker is a first fiducial marker. Additionally or alternatively, the method further includes determining, in the continuous non-AR video feed, a second spatial anchor from a second fiducial marker; and the computing of the plane is performed further based on the second spatial anchor.

In one variation, the method further includes determining that the field service device has not received either a send command or a clear command from the remote expert device; and in response to the determination that the field service device has not received either a send command or a clear command, determining if an AR scribble list is empty.

In one variation, the creation of the continuous AR video feed occurs by re-drawing the AR scribble pattern such that an orientation of the AR scribble pattern remains the same even when the camera orientation changes.

In one variation, the method further includes determining the field service device has received a send command from the remote expert device. Additionally or alternatively, the determination of the spatial anchor in the continuous non-AR video feed is performed in response to the determination the field service device has received a send command from the remote expert device.

In one variation, the determination of the spatial anchor in the continuous non-AR video feed from the fiducial marker is made based upon a predetermined 3-dimensional (3D) image.

In one variation, the camera orientation is an orientation of the camera relative to the fiducial marker.

In one variation, the method further includes receiving, at the processor of the field service device, a field service scribble pattern input by a user of the field service device, wherein the field service scribble pattern comprises an array of coordinates; and mapping, at the processor of the field service device, the field service scribble pattern to the plane to create an AR field service scribble pattern. The creation of the continuous AR video feed may be further based on the AR field service scribble pattern.

In another aspect, there is a method for producing remote assistance via augmented reality (AR) by utilizing a remote expert device. The method includes receiving, at a processor of the remote expert device, a continuous non-AR video feed generated by a camera of a field service device. The method further includes sending, from the processor of the remote expert device to the field service device, a first scribble pattern comprising an array of coordinates. The method further includes, in response to the sending of the first scribble pattern to the field service device, receiving, at the processor of the remote expert device, a continuous AR video feed from the field service device. The continuous AR video feed was created by: (i) determining a plane based on both a spatial anchor determined from a fiducial marker of the continuous non-AR video feed, and a camera orientation; (ii) mapping the first scribble pattern to the plane to create an AR scribble pattern; and (iii) creating the continuous AR video feed based on the AR scribble pattern and the spatial anchor.

In one variation, the received continuous AR video feed is created further based on an AR field service scribble pattern created by mapping, to the plane, a field service scribble pattern input by a user of the field service device.

In yet another aspect, there is a system for producing remote assistance via augmented reality (AR). The system includes a field service device configured to: generate a continuous non-AR video feed from a camera; and send the continuous non-AR video feed to a remote expert device. The system further includes the remote expert device, which is configured to: receive the continuous non-AR video feed from the field service device; and send a first scribble pattern to the field service device. The field service device is further configured to: determine a spatial anchor in the continuous non-AR video feed from a fiducial marker; determine a plane based on (i) the spatial anchor and (ii) the camera orientation; map the first scribble pattern to the plane to create an AR scribble pattern; create a continuous AR video feed based on the AR scribble pattern and the spatial anchor; and send the continuous AR video feed to the remote expert device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
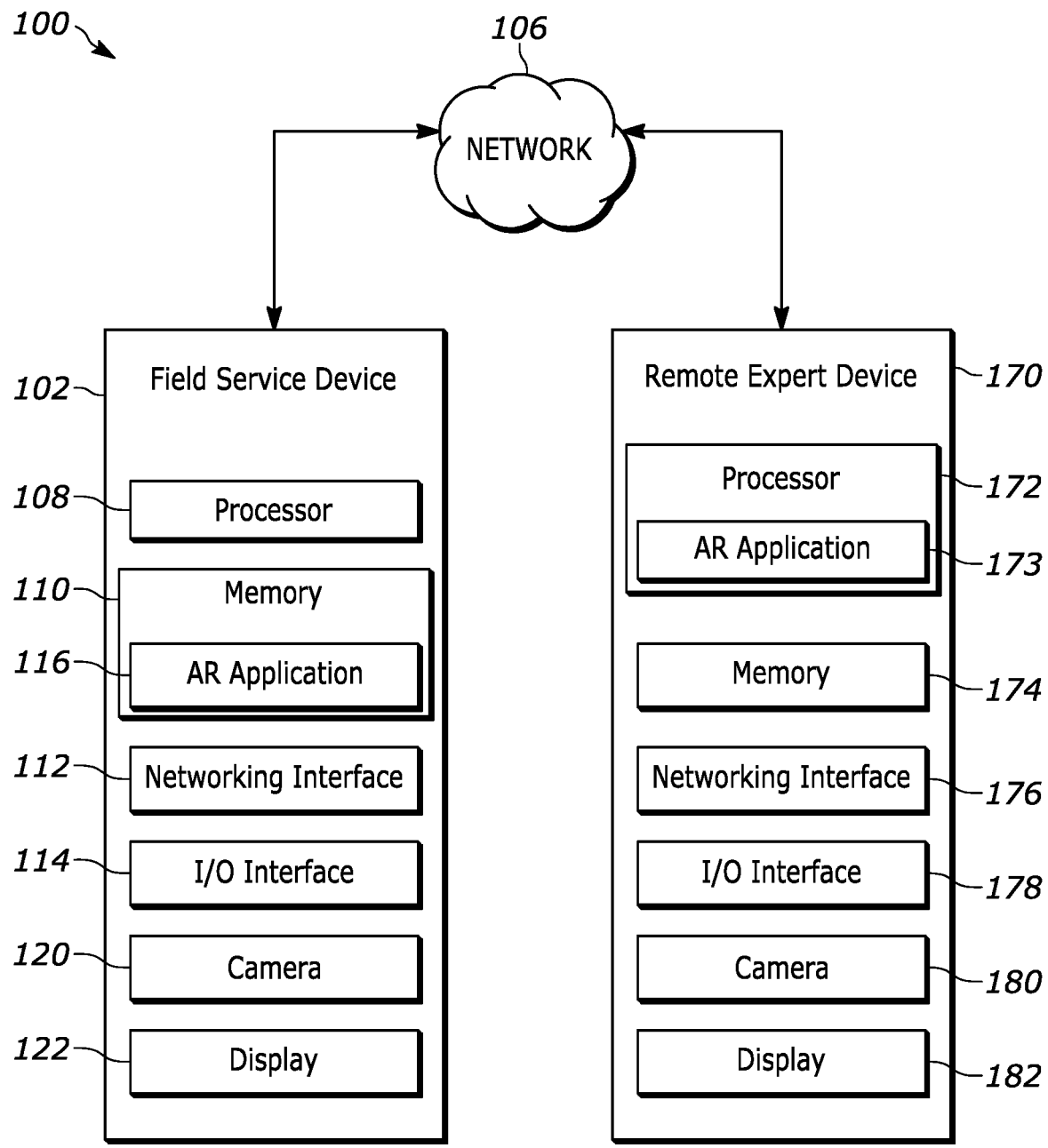
FIG. 1A is an example AR system for providing remote assistance to a field worker.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure provides techniques to facilitate communication between a field worker (e.g., a plumber or electrician at a worksite) and a remote expert (e.g., a person in an office building remotely instructing the field worker). More specifically, the present disclosure provides techniques to facilitate communication between a field worker and a remote expert using augmented reality (AR).

For example, an amateur plumber (e.g., a field worker) may be at a site repairing a plumbing system. An expert plumber (e.g., a remote expert) may be offsite (e.g., at an office building) instructing the amateur plumber. In this regard, the amateur plumber may send a video feed of what he is working on to the expert plumber; and the expert plumber may wish to indicate a particular pipe of the plumbing system depicted in the video feed. To accomplish this, in some implementations, the expert plumber is able to annotate the video feed (e.g., draw a scribble pattern onto the video feed, which is then viewable by the amateur plumber).

FIG. 1A illustrates an example AR system 100 configured to provide remote assistance, in accordance with various embodiments disclosed herein. In the example embodiment of FIG. 1A, the AR system 100 includes the field service device 102, and remote expert device 170 communicatively coupled together via a network 106.

Generally speaking, the field service device 102 is configured to run AR application 116, in accordance with the various embodiments disclosed herein. The field service device 102 may include one or more processors 108, one or more memories 110, a networking interface 112, an input/output interface 114, the AR application 116, a camera 120, and display 122.

In some implementations, the camera 120 is attached to the head of the field worker. In this way, the video feed provided by the camera 120 mimics the eyes of the field service worker. Furthermore, and as will be described in more detail below, the video feed provided by the camera 120 may be sent to the remote expert device 170; and the remote expert device 170 may provide annotations (e.g., scribble patterns) such that the annotations appear overlaid onto the video feed when the video feed is displayed, such as on either of the displays 122, 182.

In some embodiments, the display 122 is physically separated from the camera 120. For example, the camera 120 may be attached to the head of the field service worker, and the display 122 may be placed on a table near the field service worker. In other embodiments, the display 122 may be part of a VR headset. In other embodiments, the display 122 is part of a digital see through display (e.g., an electronic display that allows a user to see what is shown on the display screen but still allows the user to see though the display).

Additionally, the remote expert device 170 may be configured to run AR application 173, in accordance with the various embodiments disclosed herein. The remote expert device 170 may include one or more processors 172, one or more memories 174, a networking interface 176, an input/output interface 178, the AR application 173, a camera 180, and display 182.

Furthermore, although the example of FIG. 1A illustrates one field service device 102, and one remote expert device 170, it should be understood that the system may comprise any number of field service devices 102, and remote expert devices 170, each with the components illustrated in FIG. 1A, and each running one or more applications.

Each of the one or more memories 110, 174 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., AR application 116, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 172 (e.g., working in connection with the respective operating system in the one or more memories 110, 174) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 174 may store an operating system (OS) (e.g., Microsoft Windows, Linux, Unix, iOS, Android, etc.) capable of facilitating the functionalities, apps, methods, or other software as discussed herein. The one or more memories 110, 174 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein.

The one or more processors 108, 172 may be connected to the one or more memories 110, 174 via a computer bus responsible for transmitting electronic data, data packets, or otherwise electronic signals to and from the one or more processors 108, 172 and one or more memories 110, 174 in order to implement or perform the machine readable instructions, methods, processes, elements or limitations, as illustrated, depicted, or described for the various flowcharts, illustrations, diagrams, figures, and/or other disclosure herein.

The one or more processors 108, 172 may interface with the one or more memories 110, 174 via the computer bus to execute the operating system (OS). The one or more processors 108, 172 may also interface with the one or more memories 110, 174 via the computer bus to create, read, update, delete, or otherwise access or interact with the data stored in the one or more memories 110, 174 and/or external databases (e.g., a relational database, such as Oracle, DB2, MySQL, or a NoSQL based database, such as MongoDB). The data stored in the one or more memories 110, 174 and/or an external database may include all or part of any of the data or information described herein.

The networking interfaces 112, 176 may be configured to communicate (e.g., send and receive) data via one or more external/network port(s) to one or more networks or local terminals, such as network 106, described herein. In some embodiments, networking interfaces 112, 176 may include a client-server platform technology such as ASP.NET, Java J2EE, Ruby on Rails, Node.js, a web service or online API, responsive for receiving and responding to electronic requests. The networking interfaces 112, 176 may implement the client-server platform technology that may interact, via the computer bus, with the one or more memories 110, 174 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 176 may include, or interact with, one or more transceivers (e.g., WWAN, WLAN, and/or WPAN transceivers) functioning in accordance with IEEE standards, 3GPP standards, 4G standards, 5G standards, or other standards, and that may be used in receipt and transmission of data via external/network ports connected to network 106. In some embodiments, network 106 may comprise a private network or local area network (LAN). Additionally or alternatively, network 106 may comprise a public network such as the Internet. In some embodiments, the network 106 may comprise routers, wireless switches, or other such wireless connection points communicating to the field service device 102, and the remote expert device 170, via wireless communications based on any one or more of various wireless standards, including by non-limiting example, IEEE 802.11a/b/c/g (WIFI), the BLUETOOTH standard, or the like.

The input/output interfaces 114, 178 may include or implement operator interfaces configured to present information to an administrator or operator and/or receive inputs from the administrator or operator. An operator interface may provide a display screen (e.g., display 122 or display 182) which a user/operator may use to visualize any images, graphics, text, data, features, pixels, and/or other suitable visualizations or information.

As mentioned above, in one illustrative example, a field worker (e.g., equipped with the field service device 102) may be at a site repairing a plumbing system. And, a remote expert (e.g., equipped with the remote expert device 170) may be offsite (e.g., at an office building) instructing the field worker on how to repair the plumbing system. Here, the field service device 102 may send a video feed to the remote expert device 170; and the remote expert device may provide annotations (e.g., a scribble pattern) onto the video feed.

Figure 1B:
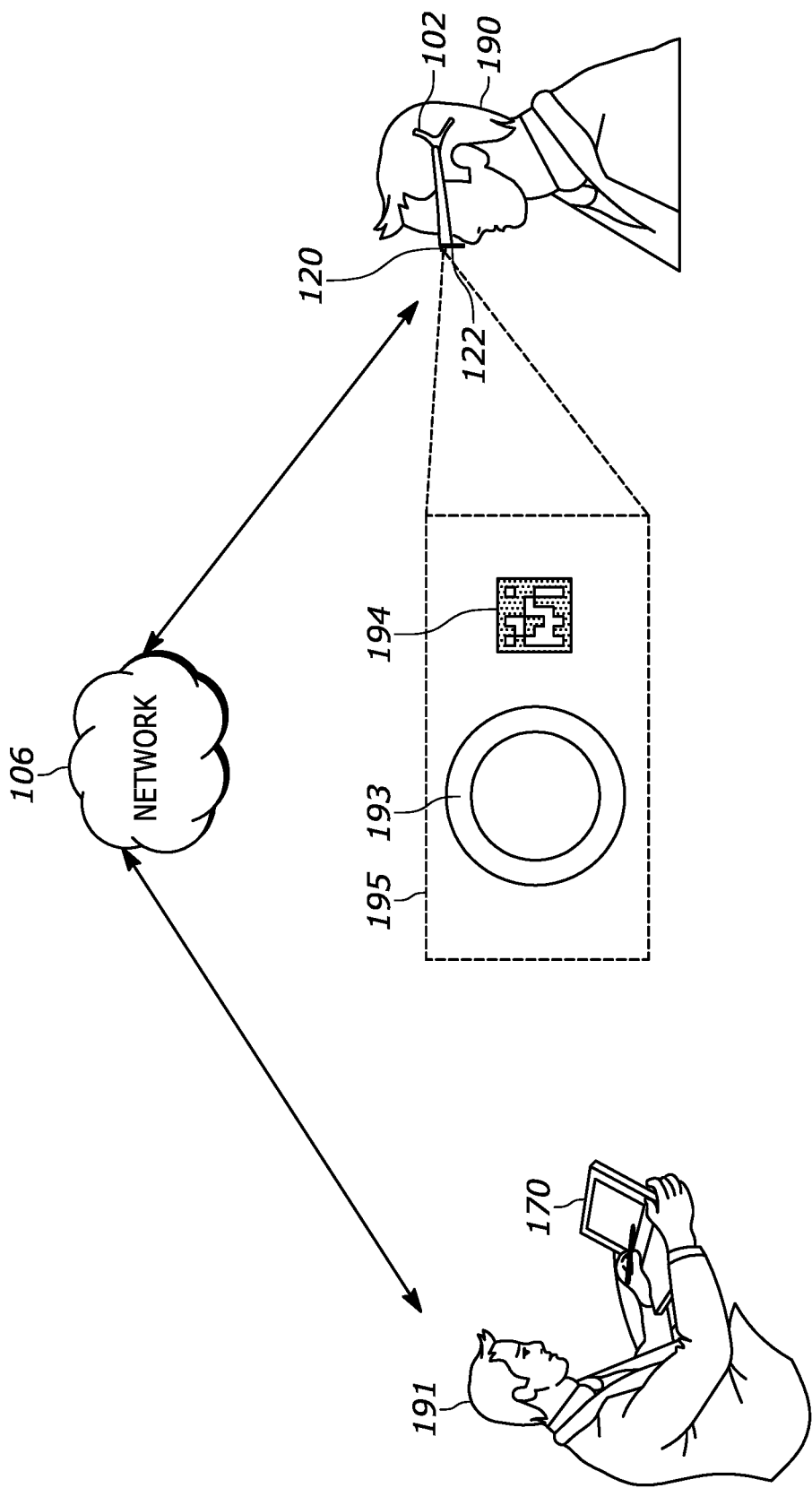
FIG. 1B illustrates an example AR system for providing remote assistance to a field worker, including a view of a field service worker.

In this regard, FIG. 1B illustrates an example AR system for providing remote assistance to a field worker, including a view 195 of a field service worker 190. In particular, the field service worker 190 may view fiducial marker 194 through a see though display 122 of the field service device 102 (which, in this example, comprises a pair of glasses including a camera 120). The remote expert user 191 uses the remote expert device 170 to draw scribble pattern 193, which the display 122 allows the field service worker 190 to see.

Figure 2A:
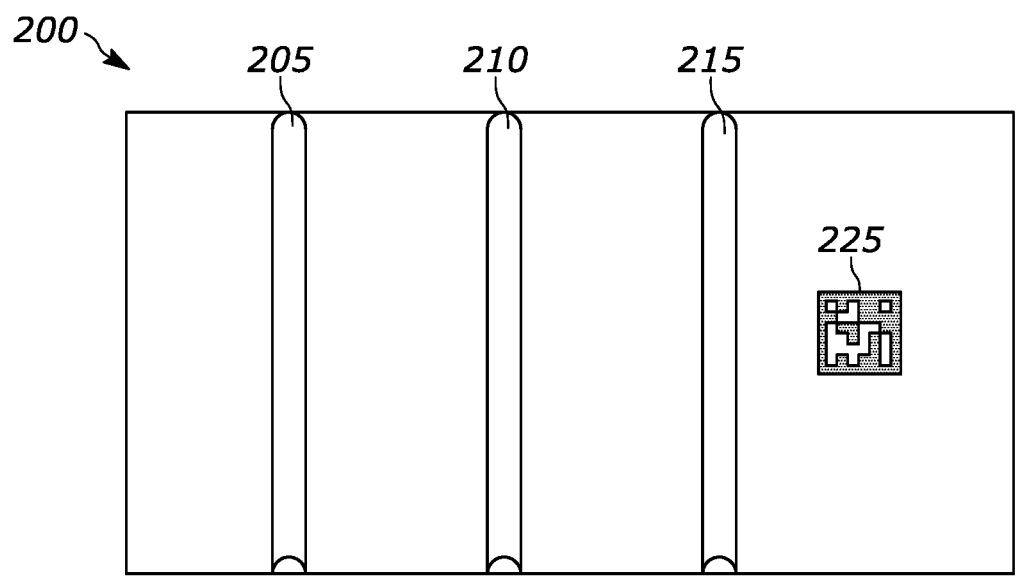
FIG. 2A illustrates an example of a screenshot from a non-AR video feed from the field service device.
Figure 2B:
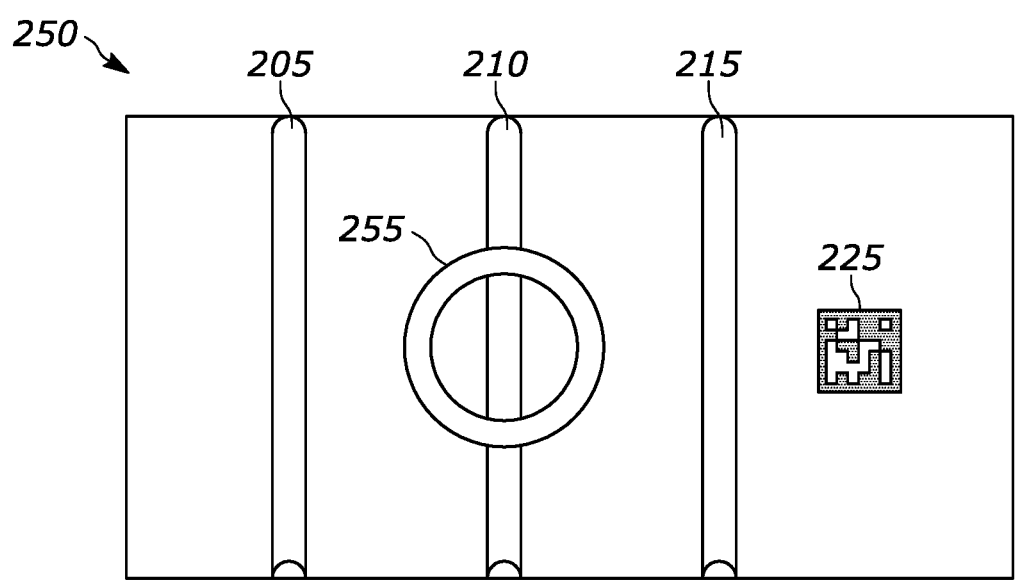
FIG. 2B illustrates an example of a screenshot from an AR video feed including an AR scribble pattern.

Further in this regard, FIG. 2A illustrates an example screenshot 200 from a video feed provided by the camera 120 of the field service device 120. More specifically, the example screenshot 200 shows pipes 205, 210, 215 (e.g., the view that is seen by the field worker while she is working on the plumbing system), and does not include AR annotations (e.g., AR scribbles). Upon viewing this video feed, the remote expert may wish to indicate a particular pipe from among the pipes 205, 210, 215. For example, the remote expert may wish to indicate pipe 210 by circling the pipe 210 on the video feed (e.g., drawing a circular scribble pattern around pipe 210 in the video feed). FIG. 2B illustrates such an example of this. In particular, FIG. 2B depicts screenshot 250 in which a circular scribble pattern 255 has been drawn around pipe 210.

Figure 3:
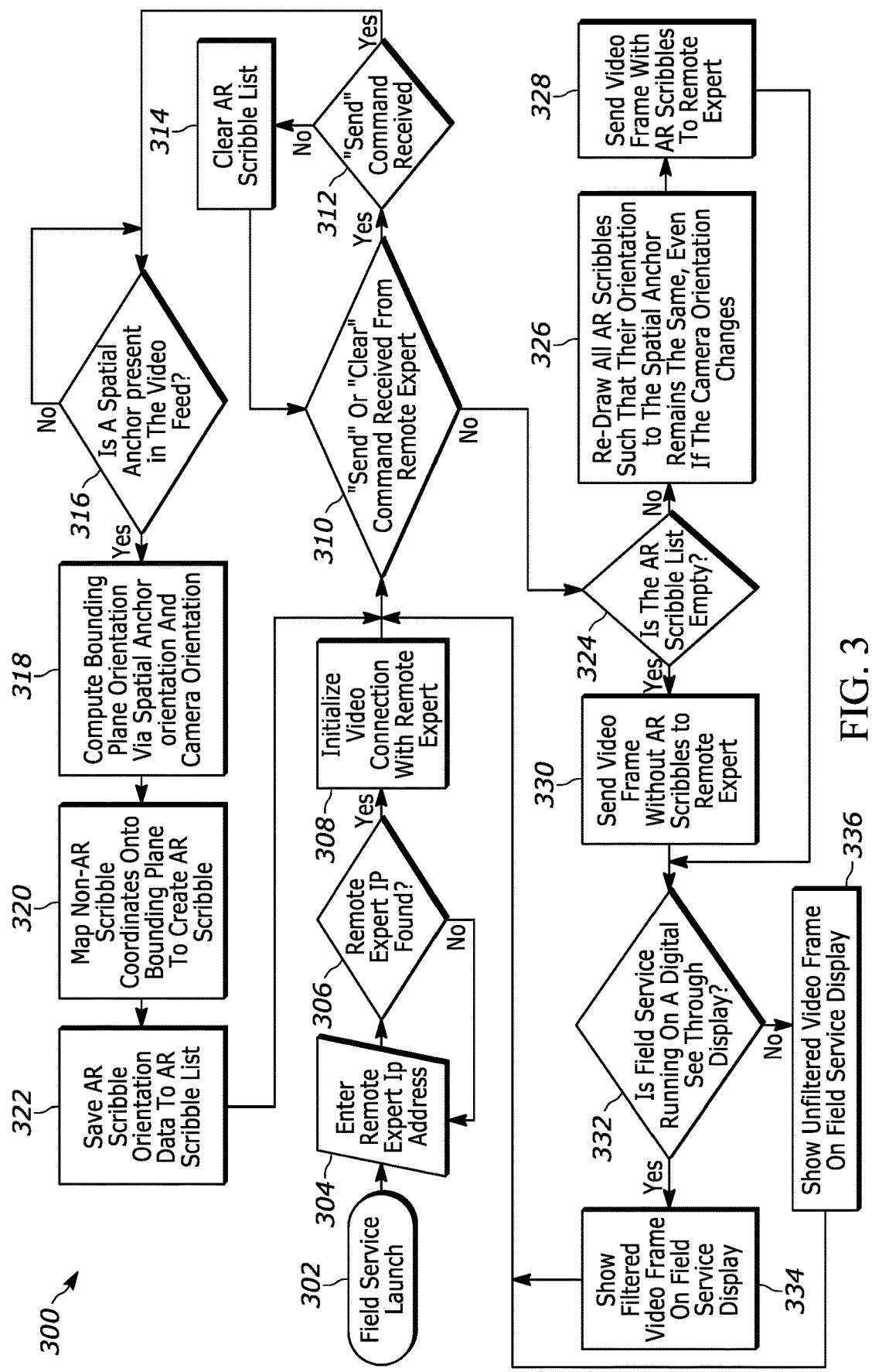
FIG. 3 is a flow diagram of an example method performed by the field service device.

To further explain, FIG. 3 illustrates a flow diagram of an example method 300 performed by the field service device 102. At block 302, the example method 300 begins by launching the AR application 116. At block 304, a remote expert IP address is entered. At block 306, it is determined if the remote expert IP is found. If not, the method returns to block 304 for a remote expert IP address to be entered. If so, at block 308, a video connection with the remote expert device 170 is initialized.

In some embodiments, when the video connection is initialized between the field service device 102 and the remote expert device 170, the video feed from the camera 120 is sent from the field service device 102 to the remote expert device 170 over the network 106. In some embodiments, this video feed is a continuous non-AR video feed.

At block 310, it is determined if a "send" or "clear" command has been received from the remote expert device 170 at the field service device 102. For example, a user of the remote expert device may enter a scribble pattern (e.g., with a pen, stylus, or her finger on a touch screen, etc.), and subsequently press "send" on the remote expert device. Alternatively, the user of the remote expert device 170 may enter the scribble pattern, and the remote expert device 170 may automatically determine that the user has finished entering the scribble pattern, and, in response, automatically deliver the "send" command; for example, when the user finishes drawing the scribble pattern and removes the stylus (or the pen, or his finger, etc.) from contact with remote expert device 170, the remote expert device 170 may automatically determine to deliver the "send" command.

In some embodiments, along with the send command, the remote expert device sends the non-AR scribble pattern (e.g., the pattern entered by the user into the remote expert device 170, e.g., a "first scribble pattern"). In some embodiments, the non-AR scribble pattern comprises an array of coordinates.

In this regard, it should be noted that the remote expert device 170 sending the non-AR scribble pattern, rather than an entire video feed, can have at least two advantages. First, this reduces bandwidth usage. Second, this reduces latency time (e.g., the time that it takes for the scribbles to appear on the field service device).

At a block 312, if it is determined that a "send" command is not received then a "clear" command has been received and the method proceeds to block 314 where, in response to receiving the "clear" command, the field service device 102 clears an AR scribble list stored in the field service device 102. Subsequent to the clearing of the AR scribble list, the method returns to block 310.

If the "send" command is received at block 312, the method proceeds to block 316, and determines if a spatial anchor (as determined, e.g., from a fiducial marker, such as the fiducial marker 225 of FIGS. 2A-D and 5) is present in the video feed gathered by the camera 120. For example, the spatial anchor may be determined by a fiducial marker, such as the example fiducial marker 225 of FIGS. 2A-D and 5. Any suitable technique may be used to determine the fiducial marker. For instance, a computer vision technique, pattern recognition technique, a technique base on recognizing a predetermined 3D image, etc. may be used. If no spatial anchor is found in the video feed, the field service device 316 simply keeps searching until one is found.

Figure 2C:
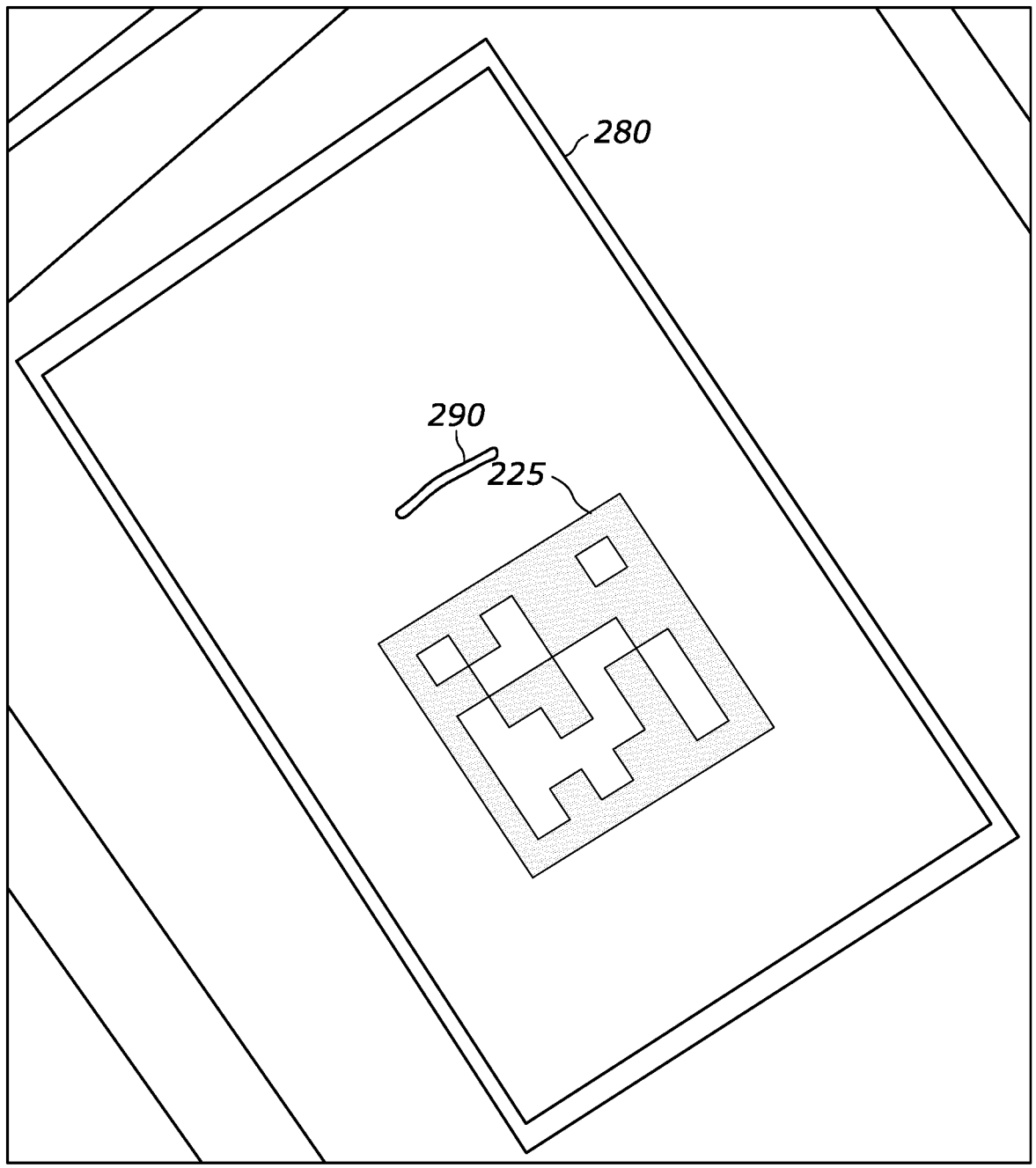
FIG. 2C illustrates an example of a screenshot from a video feed, and further includes an illustration of an example bounding plane.
Figure 2D:
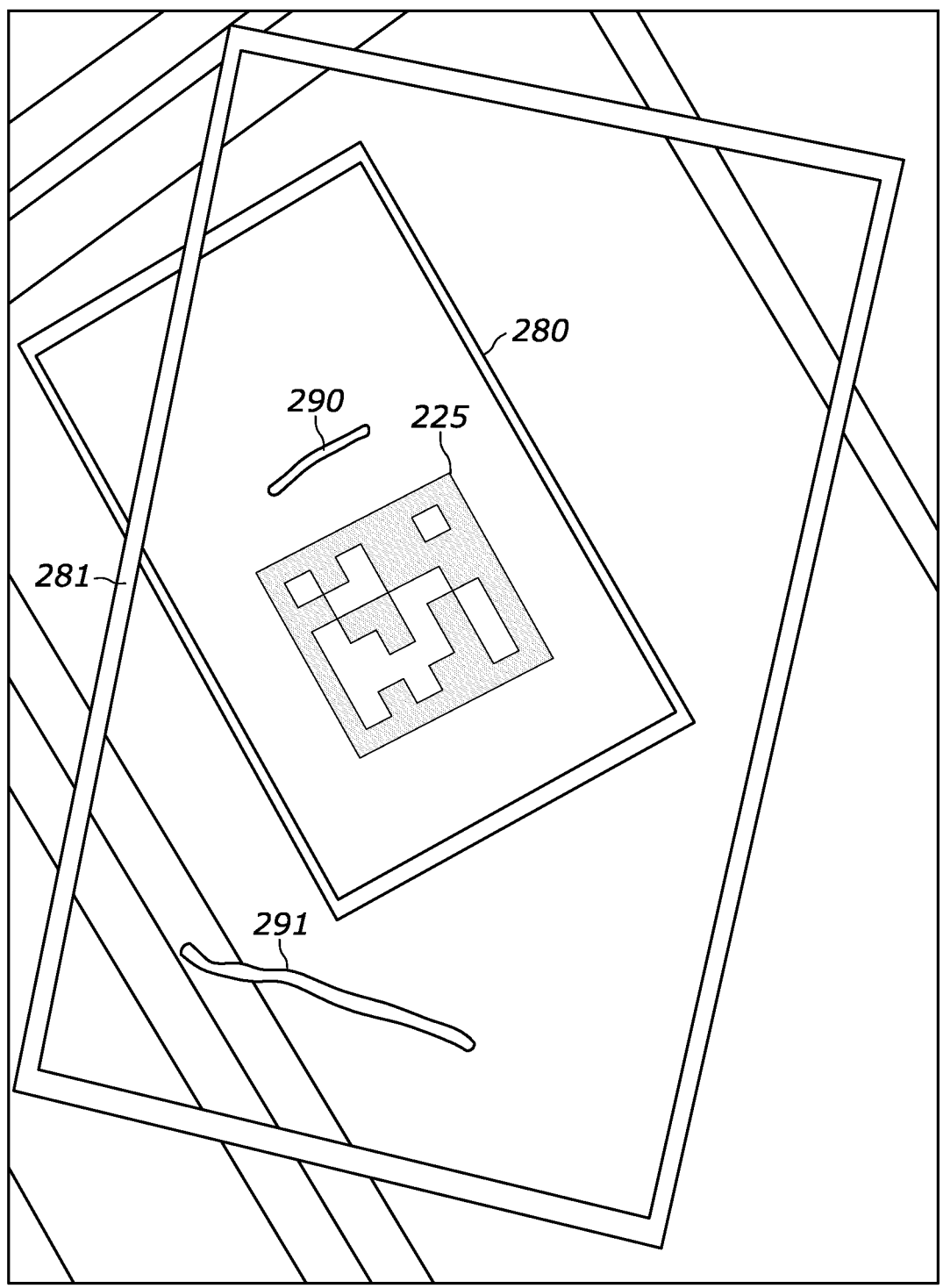
FIG. 2D illustrates an example of a screenshot from a video feed, and further includes an illustration of two example bounding planes.

Upon determination of the spatial anchor, the method proceeds to step 318, where the field service device computes a bounding plane based on the spatial anchor and an orientation of the camera. For illustration purposes, a bounding plane 280 is shown in the example of FIG. 2C, although bounding planes are not typically displayed but rather computed for accurate display of scribbles in an AR video. In the illustrated example, the bounding plane 280 is computed based on the spatial anchor in a field of view of the camera and an orientation of the camera, at the completion of a scribble pattern 290 received from the remote expert device 170. That is, in various embodiments, the field service device upon determining the presence of a spatial anchor in its video feed and in response to receiving a non-AR scribble from the remote expert (e.g., non-AR scribble coordinates) generates a bounding plane. Preferably, that bounding plane is generated upon completion of the non-AR scribble in the field of view. In creating the AR video feed that includes the AR scribble, the field service device tracks the bounding plane as the camera orientation changes, i.e., repositions the bounding plane relative to a changing field of view. And by maintaining the scribble in that bounding plane, the AR scribble is displayed in the AR video feed and adjusted in the field of view as the bounding plane is moved. In this way, the field service device may generate the AR video feed with the AR scribble by tracking changes in the position of the bounding plane, i.e., as the camera rotates in various directions. Indeed, FIG. 2C illustrates the scribble pattern 290 (maintained in the bounding plane 280) after that bounding plane 280 has already been generated and the camera has been rotated clockwise and pulled backed from the fiducial marker 225. In various embodiments, upon receipt of each scribble pattern from the remote expert device, the field service device generates a respective bounding plane, preferably at the completion of the scribble pattern, and tracks each of those generated bounding planes for displaying the AR video with accurate representations of changes in their respective scribble patterns. For example, FIG. 2D illustrates an example screenshot including two bounding planes, each previously generated upon completion of a respective scribble pattern, where the screenshot shows how those bounding planes are used to track, reposition, re-orientate, and re-scale respective scribble patterns in the AR video, as the camera moves. In the illustrated example, a first bounding plane 280 is shown corresponding to a first scribble pattern 290, and a second bounding plane 281 is shown corresponding to second scribble pattern 291 drawn after the first scribble pattern 290. Thus, as shown, in some embodiments, a bounding plane is created in relation to each scribble pattern, e.g., the first bounding plane 280 created in relation to the first scribble pattern 290, and the second bounding plane 281 created in relation to the second scribble pattern 291.

In some embodiments, the bounding plane comprises an array of values. In addition, in some embodiments, the bounding plane is used as a basis to calculate a 3-dimensional (3D) coordinate system (for example, at block 320).

The orientation of the camera is relative to the fiducial marker. In some embodiments, the orientation of the camera is computed entirely based on the fiducial marker. For example, a computer vision technique may be used to compute the orientation of the camera relative to the fiducial marker. In this regard, a computer vision technique may use a pattern on the fiducial marker, as seen in the video feed, to determine an angle of the camera; further, a size that the fiducial marker appears in the video feed may be used to determine a distance that the fiducial marker is from the camera.

At block 320, the non-AR scribble pattern is mapped onto the bounding plane 280 to create an AR scribble pattern. At block 322, the AR scribble pattern is saved to an AR scribble list, for example by saving scribble data and scribble orientation data as an AR scribble pattern. And, the method then returns to block 310.

Furthermore, in some embodiments, at block 320, a 3D coordinate system may be determined. In this regard, any suitable coordinate system may be used (e.g., a Cartesian coordinate system, a cylindrical coordinate system, a spherical coordinate system, etc.). In some embodiments, the origin of the 3D coordinate system is the spatial anchor or fiducial marker, or is based on the spatial anchor or fiducial marker. Furthermore, in some embodiments, the origin of the 3D coordinate system may be used in the computation of a bounding plane. In the illustrated example, the block 322 then passes control to block 310.

In addition, in some embodiments, an offset angle is calculated between: (i) an axis of the 3D coordinate system (e.g., a fixed x, y, z axis) and (ii) the camera. In this regard, the offset angle may be used in determining an orientation of the camera, which may be determined relative to the fiducial marker or spatial anchor.

In some embodiments where there is more than one fiducial marker, the first fiducial marker/spatial anchor may be used as the origin of the coordinate system; and subsequent fiducial markers may be used to extend the coordinate system to a larger are by utilizing a coordinate system memory. For example, to extend the coordinate system, the computation of the bounding plane 280 may further be based on a second spatial anchor.

Returning to block 310, if a "send" or "clear" command is not received, the method proceeds to block 324, and it is determined if the AR scribble list is empty. If not, the method proceeds to block 326, and all AR scribbles are redrawn such that their orientation to the spatial anchor remains the same, even if the camera orientation changes.

Figure 2E:
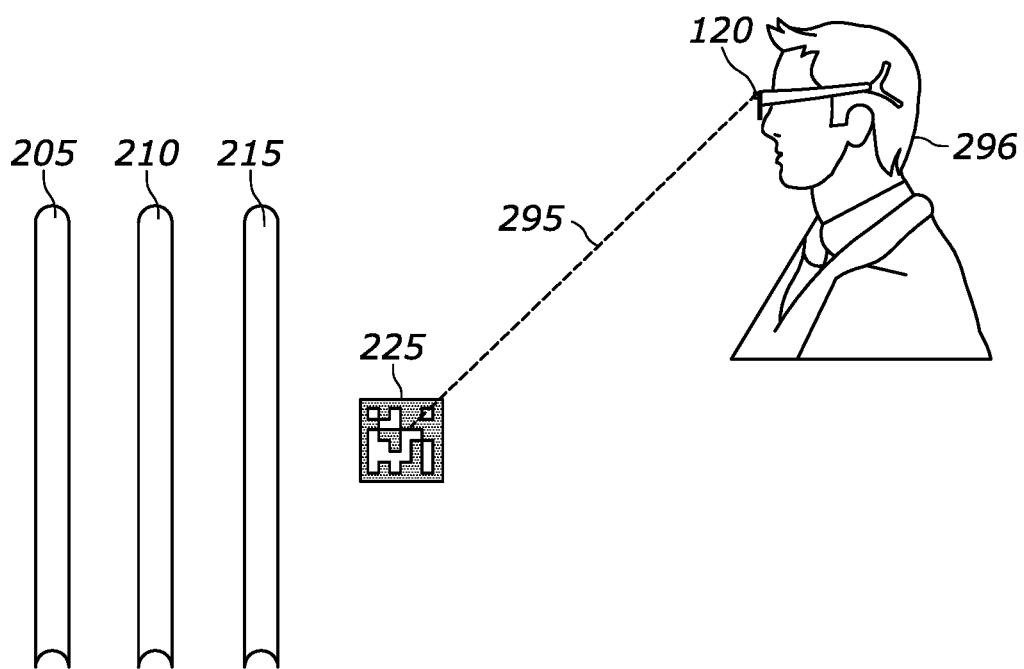
FIG. 2E illustrates an example of a camera orientation.

In this regard, FIG. 2E illustrates an example of the camera orientation 295. In particular, in the example of FIG. 2E, human user 296 (while viewing pipes 205, 210, 215) has the camera 120 attached to his head; and the camera orientation 295 is the orientation of the camera 120 relative to the fiducial marker 225. The camera orientation 295 may be stored in any suitable manner (e.g., as an angle between a bounding plane of the fiducial marker 225 and a viewpoint of the camera 120, etc.).

At block 328, the field service device 102 sends the video frame with the AR scribbles (e.g., sends the AR video feed) to the remote expert device 170 for display on the display 182. The AR video feed may also be displayed on the display 122 of the field service device 102. Subsequently, the method then proceeds to block 332.

If, at block 324, the AR scribble list is empty, the field service device 102 sends, at block 330 the video frame without AR scribbles (e.g., sends the non-AR video feed) to the remote expert device 170.

At block 332, it is determined if the field service device 102 is running on a digital see-through display (e.g., an electronic display that allows a user to see what is shown on the display screen but still allows the user to see though the display). If the field service device is not running with a see-through display, at block 336 an unfiltered video feed (e.g., a full scene video feed) is shown on the display 122 of the field service device 102. If the field service device is running with a see-through display, such as AR glasses, at block 334, a filtered video feed (e.g., a video feed of overlay graphics to be visualized by a user along with the real world scene) is shown on the display 122 of the field service device 102. In an example, the block 334 then passes control to block 310.

Figure 4:
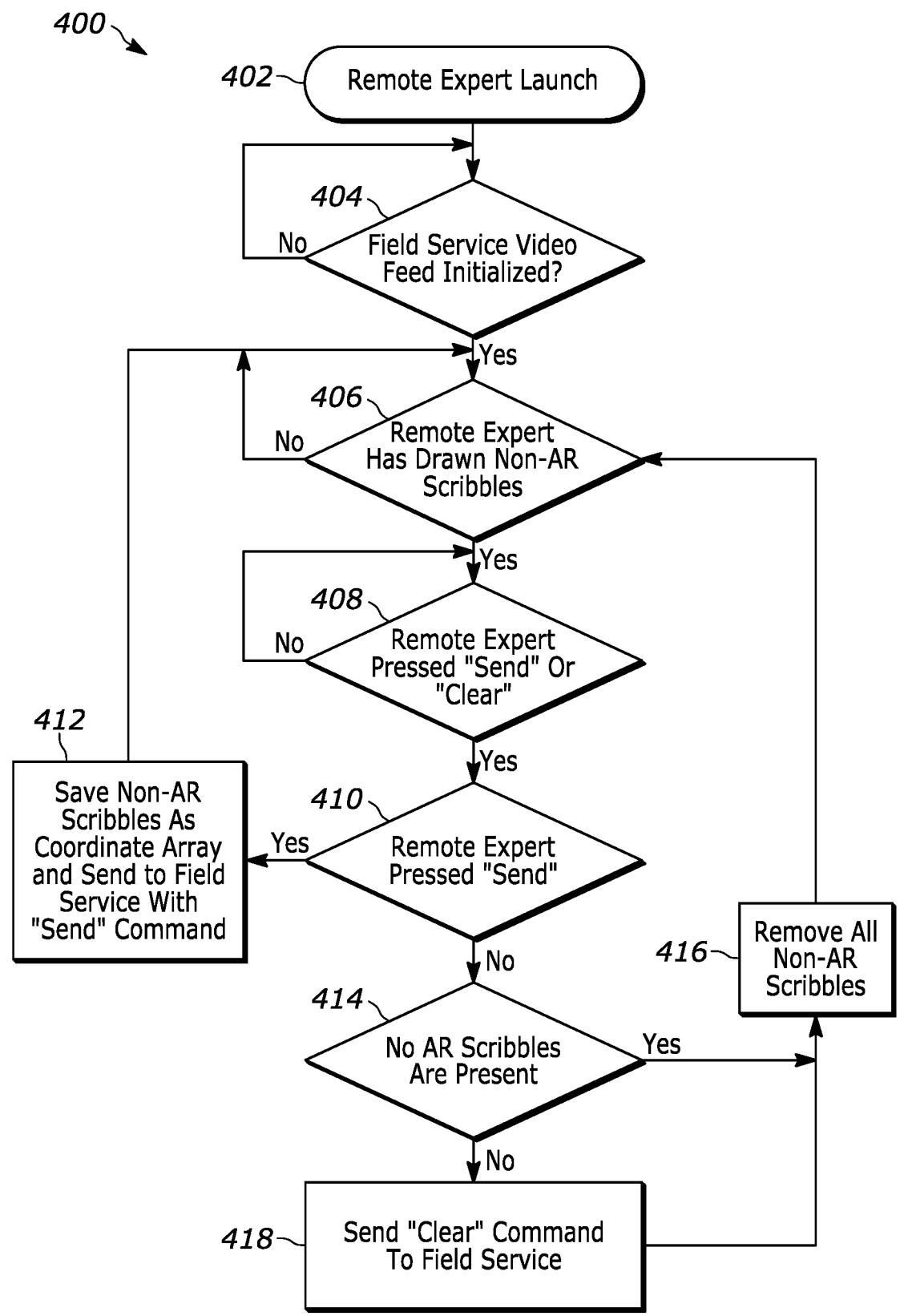
FIG. 4 is a flow diagram of an example method performed by the remote expert device.
Figure 5:
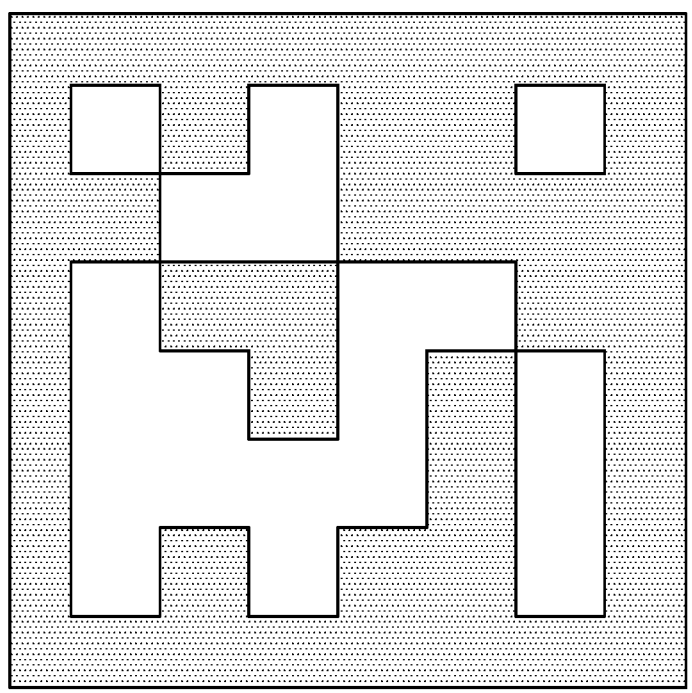
FIG. 5 illustrates an example of a fiducial marker.

FIG. 4 illustrates a flow diagram of an example method 400 performed by the remote expert device 170. At block 402, the example method 400 begins by launching the AR application 173. At block 404, the remote expert device 170 checks if the field service video feed has been initialized. If the field service video feed has not been initialized, the remote expert device 170 continues to check at block 404 until the field service video feed has been initialized. Similar to other input awaiting blocks herein, the block 404 may check at any periodicity for a state change and may employ a timeout period that resets the process 400.

If the field service video feed has been initialized, the method proceeds to block 406, and it is determined if user of the remote expert device 170 has drawn non-AR scribbles. If not, the determination is repeated until it is found that the user has drawn non-AR scribbles.

At block 408, the remote expert device 170 determines if the user has pressed "send" or "clear." If not (i.e., the user has not pressed either "send" or "clear"), the method repeats the determination until it is found that the user has pressed either "send" or "clear." Once it is found that the user has pressed either "send" or "clear," the method proceeds to block 410; and the remote expert device 170 further distinguishes which command (from among the "send" and "clear" commands) the user has entered by determining if the user has entered the "send" command. If so, at block 412, the non-AR scribbles are saved as an array of coordinates and sent to the field service device 102 along with the "send" command. In this regard, in some embodiments, the field service device 102 determines that the non-AR scribbles have been received at blocks 310 and/or 312 of FIG. 3.

If, at block 410, the "send" command has not been received, the method proceeds to block 414; and it is determined if no AR scribbles are present. If no AR scribbles are present, at block 416, the remote expert device 170 removes all non-AR scribbles (e.g., from the AR application 173, memory 174, etc.), and the method returns to block 406.

If, at block 414, AR scribbles are indeed present, the "clear" command is sent to the field service device 102 at block 418. It may be noted that, in some embodiments, the "clear" command is determined to have been received by the remote field service device 102 at blocks 310 and/or 312 of FIG. 3.

Additionally, it is to be understood that each of the actions described in the example methods 300, 400 may be performed in any order, number of times, or any other suitable combination(s). For example, some or all of the blocks of the methods 300, 400 may be fully performed once or multiple times. In some example implementations, some of the blocks may not be performed while still effecting operations herein.

Furthermore, in some embodiments, a user of the field service device 102 may also annotate the video feed. For example, a user of the field service device 102 may draw a scribble pattern onto a tablet of the field service device, which the processor 108 may convert to an array of coordinates. The processor 108 may then map the field service scribble pattern to the plane to create an AR field service scribble pattern; and then create the continuous AR video feed further based on the AR field service scribble pattern.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for producing remote assistance via augmented reality (AR) by utilizing a field service device, the method comprising:
   sending, via a processor of the field service device, a continuous non-AR video feed generated by a camera of the field service device to a remote expert device;
   receiving, at the processor of the field service device and from the remote expert device, a first scribble pattern;
   determining, at the processor of the field service device, a spatial anchor in the continuous non-AR video feed from a fiducial marker in the continuous non-AR video feed;
   determining, at the processor of the field service device, a plane based on (i) the spatial anchor and (ii) the camera orientation relative to the spatial anchor;
   mapping, at the processor of the field service device, the first scribble pattern to the plane to create an AR scribble pattern;
   creating, at the processor of the field service device, a continuous AR video feed based on the AR scribble pattern and the spatial anchor; and
   sending the continuous AR video feed from the processor of the field service device to the remote expert device for display on the remote expert device.

2. The method of claim 1, further comprising:
   displaying, on a display of the field service device, the AR video feed.

3. The method of claim 1, further comprising determining, from the spatial anchor:
   a location of an origin of a fixed three-dimensional (3D) coordinate system;
   an offset angle between: (i) a fixed x, y, z axis of the 3D coordinate system and (ii) the camera; and
   a distance from the camera to the origin of the 3D coordinate system.

4. The method of claim 3, wherein the computing of the plane is performed based on:
   the origin of the fixed 3D coordinate system;
   the offset angle; and
   the distance from the camera to the origin of the 3D coordinate system.

5. The method of claim 4, wherein the distance from the camera to the origin of the 3D coordinate system is calculated based on a size that the fiducial marker appears in a view of the continuous non-AR video feed.

6. The method of claim 1, wherein the first scribble pattern comprises an array of coordinates.

7. The method of claim 1, wherein:
   the spatial anchor is a first spatial anchor, and the fiducial marker is a first fiducial marker;
   the method further comprises determining, in the continuous non-AR video feed, a second spatial anchor from a second fiducial marker; and
   the computing of the plane is performed further based on the second spatial anchor.

8. The method of claim 1, further comprising:
   determining that the field service device has not received either a send command or a clear command from the remote expert device; and
   in response to the determination that the field service device has not received either a send command or a clear command, determining if an AR scribble list is empty.

9. The method of claim 1, wherein the creation of the continuous AR video feed occurs by re-drawing the AR scribble pattern such that an orientation of the AR scribble pattern remains the same even when the camera orientation changes.

10. The method of claim 1, further comprising:
    determining the field service device has received a send command from the remote expert device; and
    wherein the determination of the spatial anchor in the continuous non-AR video feed is performed in response to the determination the field service device has received a send command from the remote expert device.

11. The method of claim 1, wherein the determination of the spatial anchor in the continuous non-AR video feed from the fiducial marker is made based upon a predetermined 3-dimensional (3D) image.

12. The method of claim 1, wherein the camera orientation is an orientation of the camera relative to the fiducial marker.

13. The method of claim 1, further comprising:
    receiving, at the processor of the field service device, a field service scribble pattern input by a user of the field service device, wherein the field service scribble pattern comprises an array of coordinates; and
    mapping, at the processor of the field service device, the field service scribble pattern to the plane to create an AR field service scribble pattern;
    wherein the creation of the continuous AR video feed is further based on the AR field service scribble pattern.

14. A method for producing remote assistance via augmented reality (AR) by utilizing a remote expert device, the method comprising:
    receiving, at a processor of the remote expert device, a continuous non-AR video feed generated by a camera of a field service device;
    sending, from the processor of the remote expert device to the field service device, a first scribble pattern comprising an array of coordinates; and
    in response to the sending of the first scribble pattern to the field service device, receiving, at the processor of the remote expert device, a continuous AR video feed from the field service device, wherein the continuous AR video feed was created by: (i) determining a plane based on both a spatial anchor determined from a fiducial marker of in the continuous non-AR video feed, and a camera orientation; (ii) mapping the first scribble pattern to the plane to create an AR scribble pattern; and (iii) creating the continuous AR video feed based on the AR scribble pattern and the spatial anchor.

15. The method of claim 14, wherein the received continuous AR video feed is created further based on an AR field service scribble pattern created by mapping, to the plane, a field service scribble pattern input by a user of the field service device.

16. A system for producing remote assistance via augmented reality (AR), the system comprising:
    a field service device configured to:
        generate a continuous non-AR video feed from a camera; and
        send the continuous non-AR video feed to a remote expert device; and the remote expert device, wherein the remote expert device is configured to:
receive the continuous non-AR video feed from the field service device; and
send a first scribble pattern to the field service device; and wherein the field service device is further configured to:
determine a spatial anchor in the continuous non-AR video feed from a fiducial marker in the continuous non-AR video feed;
determine a plane based on (i) the spatial anchor and (ii) the camera orientation;
map the first scribble pattern to the plane to create an AR scribble pattern;
create a continuous AR video feed based on the AR scribble pattern and the spatial anchor; and
send the continuous AR video feed to the remote expert device.

\* \* \* \* \*